(12) United States Patent
Kim et al.

(10) Patent No.: US 11,522,648 B2
(45) Date of Patent: Dec. 6, 2022

(54) DATA PROCESSING METHOD AND APPARATUS WITH WIRELESS COMMUNICATION SYSTEM INCLUDING INTELLIGENT REFLECTING SURFACE

(71) Applicant: RESEARCH & BUSINESS FOUNDATION SUNGKYUNKWAN UNIVERSITY, Suwon-si (KR)

(72) Inventors: Dong In Kim, Seongnam-si (KR); Sung Yon Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 277 days.

(21) Appl. No.: 17/081,236

(22) Filed: Oct. 27, 2020

(65) Prior Publication Data

US 2021/0126359 A1    Apr. 29, 2021

(30) Foreign Application Priority Data

Oct. 28, 2019 (KR) .................. 10-2019-0134890

(51) Int. Cl.
*H04L 5/00* (2006.01)
*H04B 1/16* (2006.01)
*H04B 7/145* (2006.01)

(52) U.S. Cl.
CPC ......... *H04L 5/0007* (2013.01); *H04B 1/1676* (2013.01); *H04B 7/145* (2013.01)

(58) Field of Classification Search
CPC . H04L 5/0007; H04L 27/2332; H04L 27/261; H04L 2001/0097; H04L 25/02;
(Continued)

(56) References Cited

U.S. PATENT DOCUMENTS 9,083,426 B1 * 7/2015 Freedman ............... H01Q 15/14
11,050,140 B2 * 6/2021 Khripkov ................ H01Q 3/40
(Continued)

FOREIGN PATENT DOCUMENTS

WO    WO-2022082149 A1 *  4/2022

OTHER PUBLICATIONS

Tuan, P. V., & Son, P. N. (Jul. 12, 2022). Intelligent Reflecting Surface Assisted Transceiver Design Optimization in Non-linear SWIPT Network with Heterogeneous Users. Wireless Networks, vol. 28(5), pp. 1889-1908. doi:http://dx.doi.org/10.1007/s11276-022-02938-6 (Year: 2022).*

(Continued)

*Primary Examiner* — Lana N Le
(74) *Attorney, Agent, or Firm* — NSIP Law (57) ABSTRACT

An electronic device, includes an intelligent reflecting surface and an electronic device controller. The intelligent reflecting surface is configured to reflect all or a part of a received signal. The electronic device controller is configured to control the intelligent reflecting surface to determine a first phase of the intelligent reflecting surface to increase a relay gain of first data of the received signal, determine a second phase related to second data, and control a phase of the intelligent reflecting surface based on a sum of the first phase and the second phase to reflect the first data and the second data to a receiving device by beamforming.

15 Claims, 8 Drawing Sheets

(58) Field of Classification Search
CPC ......... H04L 27/32; H04L 5/02; H04B 1/1676; H04B 7/145; H04B 1/109; H04B 7/15578; H04B 7/0617; H04B 7/086; H04B 7/15528; H04B 7/088; H04B 7/0408; H04B 7/084; H04B 10/548; H04B 7/0671; H04B 14/006; H04B 1/123; H01Q 3/46; H01Q 3/26; H01Q 15/14; H01Q 3/36; H01Q 19/18; H01Q 19/10; H01Q 3/24
See application file for complete search history.

(56) References Cited

U.S. PATENT DOCUMENTS

| | | | |
|---|---|---|---|
| 2018/0358686 A1* | 12/2018 | Park | H01Q 1/2283 |
| 2020/0145084 A1* | 5/2020 | Yan | H04B 17/309 |
| 2020/0228272 A1* | 7/2020 | Soriaga | H04W 56/001 |
| 2021/0041522 A1* | 2/2021 | Manolakos | H04L 5/0048 |
| 2022/0271825 A1* | 8/2022 | Pace | H04B 7/0695 |

OTHER PUBLICATIONS

Wu, Qingqing, et al.."Intelligent Reflecting Surface Enhanced Wireless Network: Joint Active and Passive Beamforming Design." *2018 IEEE Global Communications Conference (GLOBECOM)*. IEEE, 2018 (6 pages in English).
Korean Office Action dated Jul. 28, 2020 in counterpart Korean Patent Application No. 10-2019-0134890 (4 pages in Korean).

* cited by examiner

ated thereon, and a receiving device 130 which receives the

DATA PROCESSING METHOD AND APPARATUS WITH WIRELESS COMMUNICATION SYSTEM INCLUDING INTELLIGENT REFLECTING SURFACE

CROSS-REFERENCE TO RELATED APPLICATIONS

This application claims the benefit under 35 USC 119(a) of Korean Patent Application No. 10-2019-0134890 filed on Oct. 28, 2019, in the Korean Intellectual Property Office, the entire disclosure of which is incorporated herein by reference for all purposes.

BACKGROUND

1. Field

The following description disclosure relates to an electronic device including an intelligent reflecting surface and a wireless communication system using the same.

2. Description of Related Art

Figure 1:
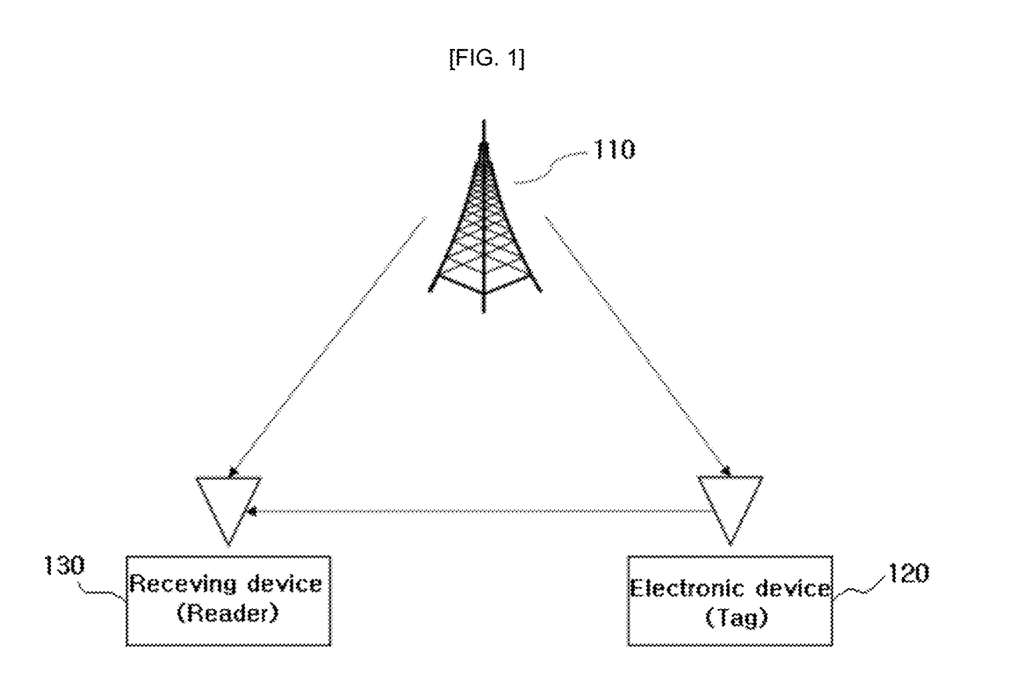
FIG. 1 is a diagram of a conventional ambient backscattering communication system.

There are mainly three backscattering techniques: monostatic backscattering, bistatic backscattering, and ambient backscattering which supplement disadvantages of the former two backscattering techniques. A backscattering system may be configured by an RF signal transmitting device 110, an electronic device 120 which uses the RF signal as a carrier to send information of a secondary system modulated thereon, and a receiving device 130 which receives the information of the electronic device 120, as illustrated in FIG. 1. In the case of the monostatic backscattering technique, a carrier emitter and a transmitting device are collocated, which may cause a round-trip path loss problem. In order to solve the above-mentioned problem, in a bistatic backscattering technique, a carrier emitter and a transmitting device separately located to increase the communication distance of the sensor, but there is a disadvantage in that an installation cost is increased. Unlike the bistatic backscattering technique, an ambient backscattering technique uses an existing RF signal such as ambient TV or Wi-Fi as a carrier to send the information of the electronic device 120 modulated thereon. In the backscattering technique, a basic operating method of the electronic device 120 is as follows: device 120 reflects an incoming RF signal to the predetermined receiver by using the difference between its antenna impedance and modulate impedances, switching between appropriate load impedance values depending on its digital information.

A separate carrier emitter that consumes a relatively large amount of power may not be necessary for the ambient backscattering technique, which may afford the ambient backscattering technique to be implemented with relatively low power and cost. Further, information is modulated on an existing signal to be sent to further efficiently use existing spectrum. However, according to the above-described techniques, two main problems may be caused. Firstly, in addition to information reflected from the electronic device 120, there may be a strong direct link interference (DLI) signal that is directly received by the receiving device 130 from the transmitting device 110 in the receiving device 130. Secondly, unlike an unmodulated carrier which may be easily removed in the monostatic or bistatic backscattering technique, an RF signal which is already modulated is used making it relatively more difficult to decode the information of the electronic device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device, includes an intelligent reflecting surface and an electronic device controller. The intelligent reflecting surface is configured to reflect all or a part of a received signal. The electronic device controller is configured to control the intelligent reflecting surface to determine a first phase of the intelligent reflecting surface to increase a relay gain of first data of the received signal, determine a second phase related to second data, and control a phase of the intelligent reflecting surface based on a sum of the first phase and the second phase to reflect the first data and the second data to a receiving device by beamforming.

A difference between a transmission rate of the first data and a transmission rate of the second data may be substantially equal to or higher than a predetermined threshold value.

The intelligent reflecting surface may include a metasurface configured to convert a baseband signal related to the second data into a passband signal using an unmodulated carrier for transmitting the second data.

The first data and the second data may be reflected to the receiving device including a receiver transceiver and a receiver controller. The receiver controller may be configured to control the receiver transceiver to receive a signal comprising the first data and the second data, apply a bandpass filter to the signal to decode the second data, extract the first data from the signal based on the decoded second data, and decode the extracted first data.

The second data may be modulated in an M-ary phase shift keying (MPSK) manner and the receiver controller may be further configured to extract the first data from the received signal based on a phase corresponding to information of the decoded second data to estimate data from a transmitting device.

The received signal may be transmitted from a transmitting device including a transmitter transceiver configured to transmit a signal comprising a sum of primary data and an unmodulated carrier, and receive a pilot signal and a transmitter controller. The transmitter controller may be configured to determine a minimum throughput required for a wireless communication system to process the first data, determine a power-splitting factor related to the transmission of the first data and the second data, a transmitting device beamforming vector, and a first phase vector parameter of the electronic device based on the determined minimum throughput, and transmit the determined first phase vector parameter of the electronic device to the electronic device.

A wireless communication technique may be configured to support the first data, the second data, and simultaneous wireless information and power transfer (SWIPT).

When a DC-biased OFDM signal is utilized in transmission of the received signal, a transmission rate of subcarrier data of the first data and a transmission rate of the second data may be substantially equal.

When a transmission rate of subcarrier data of the first data and a transmission rate of the second data are substantially equal, an existing OFDM receiver may be available in the receiving device.

A wireless communication system may include the electronic device, the transmitting device, and the receiving device.

In another general aspect, a data processing method including an intelligent reflecting surface including: determining a first phase of the intelligent reflecting surface to increase a relay gain of first data; determining a second phase related to second data; and reflecting the first data and the second data to a receiving device through beamforming by controlling a phase of the intelligent reflecting surface based on a sum of the first phase and the second phase.

The data processing method may further include setting a difference between a transmission rate of the first data and a transmission rate of the second data to be substantially equal to or higher than a predetermined threshold value.

The data processing method may further include, after the reflecting the first data and the second data to the receiving device, receiving a reflected signal of the reflecting of the first data and the second data, and the first data may be transmitted from a transmitting device and the second data may be transmitted from an electronic device; decoding the second data by applying a bandpass filter to the reflected signal; extracting the first data from the reflected signal based on the decoded second data; and decoding the extracted first data.

The second data may be modulated in an M-ary phase shift keying (MPSK) manner and, in the extracting of the first data, the first data may be extracted from the reflected signal based on a phase corresponding to information of the decoded second data.

The data processing method may further include, before the determining of the first phase, estimating a channel; determining a minimum throughput to process the first data; determining a power-splitting factor, a beamforming vector, a first phase vector parameter of the electronic device related to transmission of the first data and the second data based on the determined minimum throughput; and transmitting the determined first phase parameter to the electronic device.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Numerous studies have been conducted to solve the limited distance problem of an ambient backscattering communication technique, but there exist fundamental limitations. First, during a process of reflecting the RF signal from the electronic device, a signal of the electronic device undergoes one more attenuation and becomes weaker. Second, due to a rate difference of a low-rate electronic device signal which is much slower than a high-rate RF signal, there is a fundamental limitation in an electronic device signal transmission rate. Third, when there is a direct link between the transmitting device and the receiving device, the RF signal is directly received without passing through the electronic device so that there is a direct link interference signal may be stronger than a signal of the electronic device.

Since the carrier may be sent from a feeding antenna to be reflected to transmit information, the metasurface may require a separate carrier emitter. Accordingly, a technique that solves a carrier supplying problem for an operation of the metasurface, acquires a passive beamforming effect through signal reflection, and improves a limited communication distance problem of an ambient backscattering as a final goal is desirable.

Figure 2:
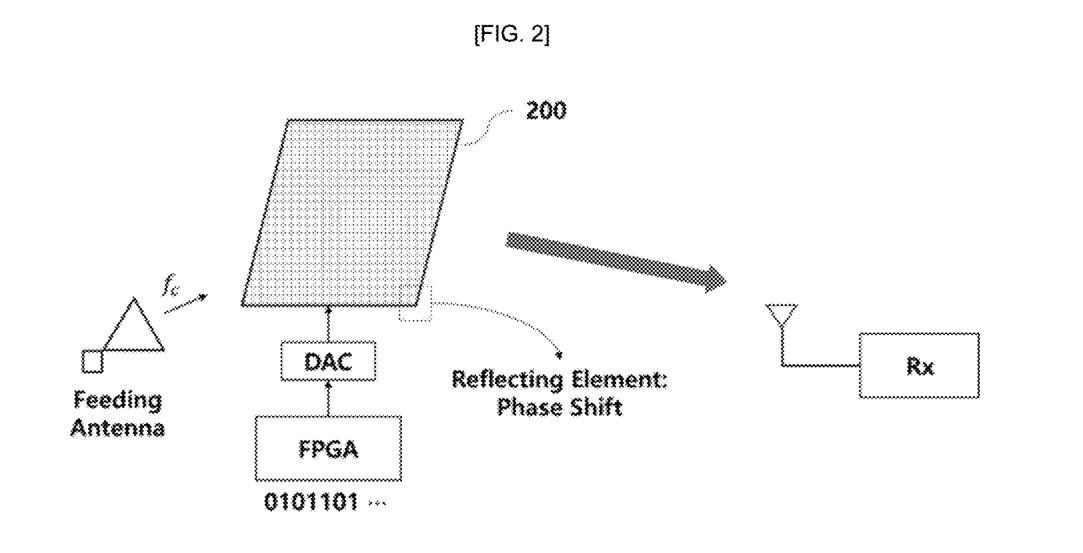
FIG. 2 is a view explaining data transmission and reception through a metasurface.

FIG. 2 is a view explaining data transmission and reception through a metasurface.

According to one or more embodiments, a metasurface may be a two-dimensional structure formed of a metamaterial. For example, the metasurface may be a two-dimensional structure formed of a low-cost passive element such as a varactor diode. Unlike natural materials, which derive characteristics from their molecular structure, the metasurface may induce customized reaction according to a user's purpose in accordance with the structure of a meta-atom of the metamaterial, and reflect an impinging electromagnetic wave in accordance with the user's purpose by modulating a phase of reflecting elements.

According to one or more embodiments, the metasurface may be used not only to help a communication purpose of the user, but also to transmit independent information. According to various embodiments, the metasurface 200 may directly transmit a baseband signal to a user using an unmodulated carrier from a feeding antenna. That is, the metasurface 200 serves as a mixer which up-converts the baseband signal to a passband signal to lower a complexity of an RF chain and reduce the power consumption.

According to one or more embodiments, various modulation techniques may be used on the metasurface and the phase of a signal may be adjusted by converting digital information to be transmitted into a voltage using a field programmable gate array (FPGA) and a digital-to-analogue converter (DAC) to apply a biased voltage to diodes that form elements of an array antenna, thereby implementing phase-shift keying (PSK) modulation. According to various embodiments, the frequency-shift keying (FSK) modulation may be implemented such that a period of an input voltage pulse is adjusted to generate harmonics of the carrier to be shifted to a desired frequency band.

Figure 3:
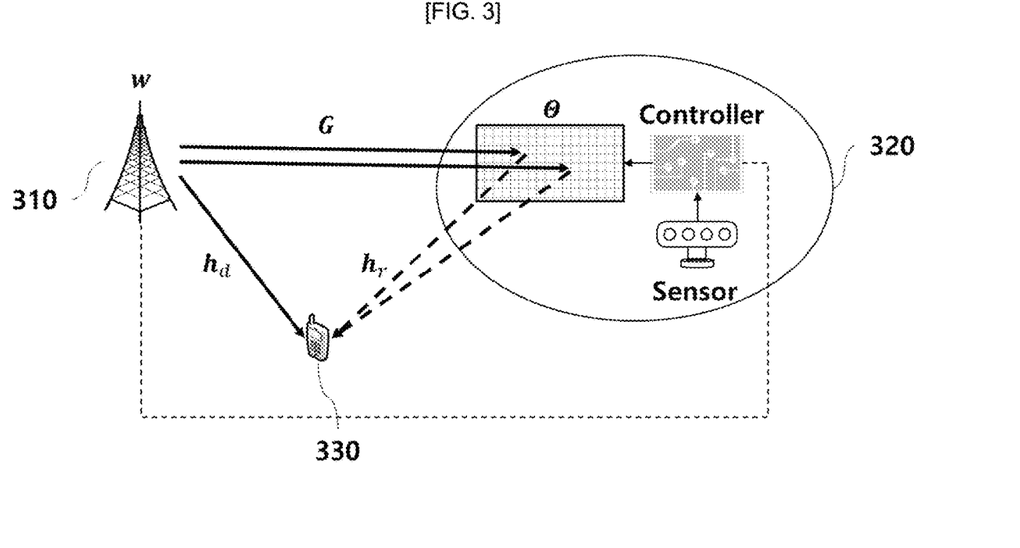
FIG. 3 is a diagram of a wireless communication system using an intelligent reflecting surface according to one or more embodiments of the present disclosure.

FIG. 3 is a diagram of a wireless communication system using an intelligent reflecting surface, according to one or more embodiments of the present disclosure.

The present disclosure proposes a technique that introduces an electronic device or system 320 in which an embedded sensor, a controller, and an intelligent reflecting surface (IRS) may be organically connected to support a primary communication system and a secondary communication system. According to one or more embodiments, the intelligent reflecting surface of the electronic device 320 may be a two-dimensional reflecting surface that is configured by a metasurface, and may align phases of each reflecting element using a controller in real time. Phases may be appropriately aligned for a channel to reflect an impinging electromagnetic wave to acquire a beamforming effect for primary data. According to various embodiments, secondary data may be transmitted by the electronic device 320 and the distance of secondary communication may be increased.

According to the embodiment, the wireless communication system may include a transmitting device 310, an electronic device 320 including an embedded sensor and an intelligent reflecting surface, and a receiving device 330.

The transmitting device 310 may have K transmission antennas and the receiving device 330 may have one reception antenna. Accordingly, the wireless communication system of the present disclosure may be a multiple-input single-output (MISO) wireless communication system which has K multiple transmission antennas and a single reception antenna with respect to the transmitting device 310 and the receiving device 330 at both ends. The electronic device 320 has a total of N reflecting elements. When it is assumed that a reflection phase of an n-th reflecting element is $\theta_n$, the total reflection phase vector may be $\theta=[\theta_1, \theta_2, \ldots, \theta_n, \ldots, \theta_N]$. A diagonal matrix corresponding to a reflection phase vector may be $\Theta=\text{diag}(\theta)$.

According to one or more embodiments, a direct link $h_d$, a relay link G, and a reflection link $h_r$ may be embodied in the wireless communication system. According to various embodiments, the direct link $h_d$ may refer to a channel between the transmitting device 310 and the receiving device 330, the relay link G may refer to a channel between the transmitting device 310 and the electronic device 320, and a reflection link $h_r$ may refer to a channel between the electronic device 320 and the receiving device 330. When a set of matrixes with a dimension a×b is $\mathbb{C}^{a\times b}$, $h_d \in \mathbb{C}^{K\times 1}$, $G \in \mathbb{C}^{K\times N}$, $h_T \in \mathbb{C}^{N\times 1}$. Further, a dimension of a diagonal matrix $\Theta$ for the reflection phase $\theta$ of the electronic device may be $\Theta \in \mathbb{C}^{N\times N}$.

According to one or more embodiments, the transmitting device 310 having K transmission antennas performs beamforming and a dimension of the beamforming vector w may be $W \in \mathbb{C}^{1\times K}$ and may be aligned to improve the performance of the multiple-input single-output system (MISO). According to various embodiments, when a transmission power of the transmitting device 310 is assumed as P, an optimal beamforming vector W* for a given phase vector $\theta$ is given as a maximum ratio transmission (MRT) for a composite channel $G\Theta h_r+h_d$ composed of three links and may be represented by the following Equation 1.

$$w^* = \sqrt{P}\frac{(G\Theta h_r + h_d)^H}{\|G\Theta h_r + h_d\|} \quad \text{Equation 1}$$

According to one or more embodiments, the transmitting device 310 splits a transmission power to transmit a sum of primary data and a carrier to the electronic device 320 and the receiving device 330. According to various embodiments, the electronic device 320 modulates secondary data of an embedded sensor on the separated carrier to transmit the secondary data to the receiving device 330.

According to one or more embodiments, the transmission power P of the transmitting device 310 may be split at a ratio of p. According to various embodiments, when primary data of the transmitting device is "s," the transmitting device 310 splits the power to transmit an equivalent baseband signal in the form of $\sqrt{\rho P}s+\sqrt{(1-\rho)P}$, which is a sum of a signal corresponding to the primary data and an unmodulated carrier to the electronic device 320 and the receiving device 330. This will be described below in more detail with reference to FIG. 4A.

According to one or more embodiments, the electronic device 320 may include a reflector array antenna configured by a metasurface. According to various embodiments, the electronic device 320 changes a phase of each element of the array antenna that embodies the metasurface to reflect an impinging electromagnetic wave.

According to one or more embodiments, the electronic device 320 reflects s transmitted from the transmitting device 310 to relay s to the receiving device 330 and modulates independent data (for example, secondary data) on the unmodulated carrier, simultaneously, to perform the communication with the receiving device 330.

One object of the present disclosure is to relay primary data transmitted from the transmitting device 310 through the electronic device 320 which operates as a passive array antenna to increase a reception power of the signal received by the receiving device 330. According to various embodiments, the electronic device 320 configured by N array antenna elements may operate like multiple antennas. For example, when a single-input single-output (SISO) wireless communication system in which the transmitting device 310 has one transmission antenna and the receiving device 330 includes one reception antenna is considered, an entire channel recognized in a relay-reflection link may be N paths from the transmitting device 310 to the electronic device 320 and N paths from the electronic device 320 to the receiving device 330. That is, in the case of the simplest single-input single-output (SISO) wireless communication system as described above, a combined array and a beamforming effect are simultaneously acquired so that a gain of up to $N^2$ may be obtained. Further, in the multiple-input single-output (MISO) wireless communication system of the present disclosure, in addition to a gain of $N^2$ by the electronic device 320, a higher gain in accordance with the number K of multiple transmission antennas of the transmitting device 310 is also obtained.

According to one or more embodiments, when a first phase of the electronic device 320 is aligned such that a direct link $h_d$ and a relay-reflection link $G\text{-}h_r$ are coherently added, the passive beamforming effect may be maximized. According to various embodiments, an aligned phase $\theta^*_n$ value of an n-th reflecting element of the electronic device 320 for a given beamforming vector w of the transmitting device 320 may be represented by the following Equation 2.

$\theta_n^*=\arg(wh_d)-\arg(wg_n)-\arg(h_{n,r})$ \quad Equation 2:

(n=1, 2, . . . , N)

In the above equation, $g_n \in \mathbb{C}^{K\times 1}$ is a channel indicating a channel between the transmitting device 310 and an n-th reflecting element of the electronic device 320 and may be an n-th column of the matrix G. The channel $h_{n,r}$ which is a channel between the n-th reflecting element of the electronic device 320 and the receiving device 330 may refer to an n-th value of the matrix $h_r$.

According to one or more embodiments, the electronic device 320 may re-align the phase of the electronic device 320 by adding a phase for transmitting secondary data to the aligned phase, after aligning a phase of the electronic device 320 to increase a relay gain of the primary data. A specific phase determining method of an electronic device for transmitting primary data and secondary data will be described below with reference to FIG. 5.

Figure 4A:
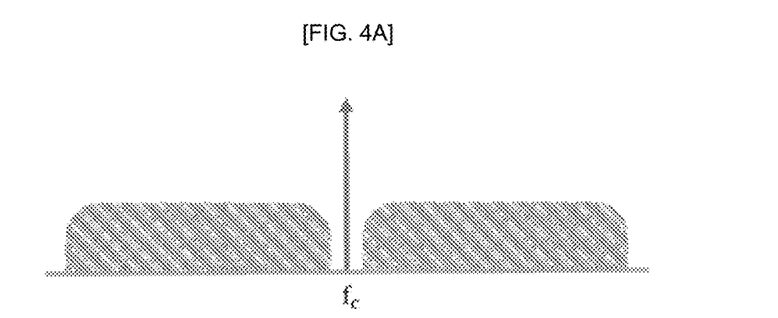
FIG. 4A is a view illustrating a signal transmitted from a transmitting device according to one or more embodiments of the present disclosure.

FIG. 4A is a view illustrating a signal transmitted from a transmitting device according to one or more embodiments of the present disclosure.

According to one or more embodiments, the transmitting device splits a power of the transmission signal to transmit both primary data and an unmodulated carrier together to the electronic device. According to various embodiments, when a power-splitting factor $\rho$ is used, a signal transmitted by the transmitting device may be configured by a sum of primary data corresponding to a ratio of $\rho$ and a carrier corresponding to $(1-\rho)$.

According to one or more embodiments, when it is considered that most of the signal corresponding to modulated primary data is a signal with an average of 0 in a baseband, a passband signal transmitted from the transmitting device may be configured by a sum of a suppressed carrier signal with an energy close to 0 in the vicinity of the carrier frequency and a carrier.

Figure 4B:
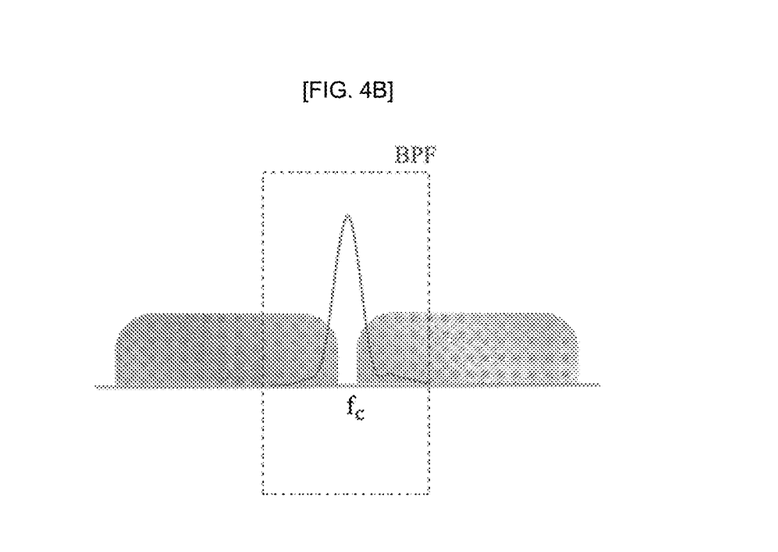
FIG. 4B is a view illustrating a signal reflected by an electronic device according to one or more embodiments of the present disclosure.

FIG. 4B is a view illustrating a signal reflected by an electronic device according to one or more embodiments of the present disclosure.

According to one or more embodiments, when the transmitting device transmits a signal including the primary data and the unmodulated carrier illustrated in FIG. 4A to the electronic device, the electronic device modulates the secondary data in the unmodulated carrier as illustrated in FIG. 4B by reflecting a signal to the receiving device. According to various embodiments, the electronic device may embed secondary data in an additional carrier with minimized interference and after the secondary data is included, a structure of a signal including primary data and secondary data may be as illustrated in FIG. 4B.

According to one or more embodiments, a receiving device which receives a signal illustrated in FIG. 4B may apply a bandpass filter with a center frequency $f_c$ to the received signal to extract only the secondary data.

Figure 5:
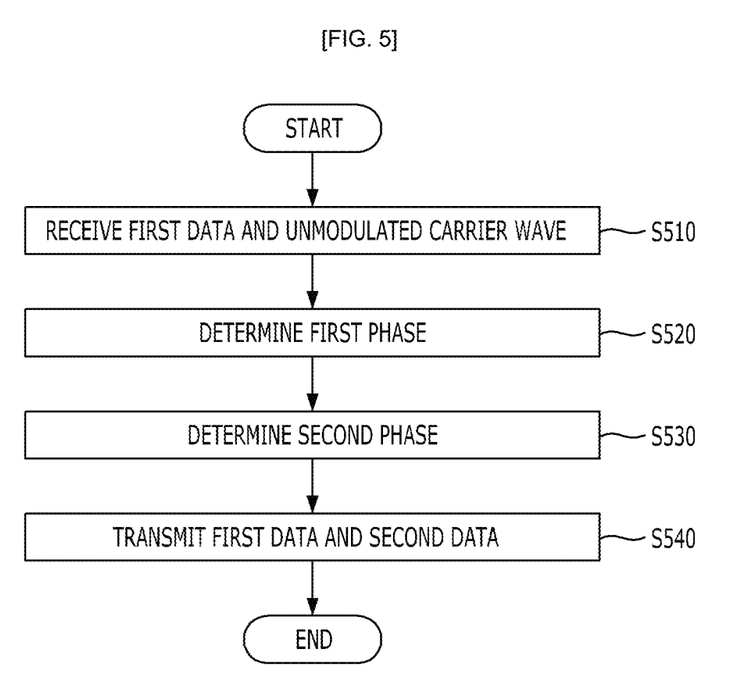
FIG. 5 is a flowchart of a data transmitting method of an electronic device according to one or more embodiments of the present disclosure.

FIG. 5 is a flowchart of a data transmitting method of an electronic device according to one or more embodiments of the present disclosure. The flowchart illustrated in FIG. 5 may be performed by an electronic device including an intelligent reflecting surface illustrated in FIG. 11.

According to one or more embodiments, in operation S510, the electronic device may recognize an unmodulated carrier from the transmitting device to transmit second data. According to various embodiments, the first data may be primary data to be transmitted from the transmitting device to the receiving device.

According to one or more embodiments, the electronic device may reflect the first data to the receiving device using the intelligent reflecting surface. According to various embodiments, the electronic device performs the beamforming through the array antenna that embodies or is the intelligent reflecting surface to improve the reflection efficiency of the first data.

According to one or more embodiments, the electronic device may determine a first phase of the intelligent reflecting surface to increase a relay gain of the first data in operation S520. According to various embodiments, as mentioned above, the first phase may be a phase value to allow a channel between the transmitting device, the electronic device, and the receiving device and a channel between the transmitting device and the receiving device to be constructively aligned. That is, the first phase may be a value which maximizes the beamforming effect of the electronic device.

According to one or more embodiments, in operation S530, the electronic device may determine a second phase related to the second data. According to various embodiments, the second data may be secondary data to be transmitted from the electronic device to the receiving device.

According to one or more embodiments, the electronic device may modulate the second data on an impinging unmodulated carrier in operation S510. According to various embodiments, the second data is modulated in an M-ary PSK manner to be modulated on the unmodulated carrier. When the second data is modulated by the M-ary PSK manner, the second phase related to the second data may be determined as $$\frac{2\pi}{M}m (m = 1, 2, \dots, M)$$

according to digital information of the second data.

According to one or more embodiments, in operation S540, the electronic device controls the phase of the intelligent reflecting surface based on a sum of the first phase and the second phase to transmit the first data and the second data to the receiving device through the beamforming. According to various embodiments, when the second data is modulated in the M-ary PSK manner and each phase aligned in the electronic device including N array antenna elements is $\theta^*_n$, the finally determined phase $\theta^{**}_n$ of the electronic device may be represented by the following Equation 3. That is, the electronic device may transmit the first data and the second data to the receiving device based on the finally determined phase.

$$\theta^{**}_n = \theta^*_n + \frac{2\pi}{M}m \qquad \text{Equation 3}$$

$(n = 1, 2, \dots, N)$ $(m = 1, 2, \dots, M)$

Figure 6:
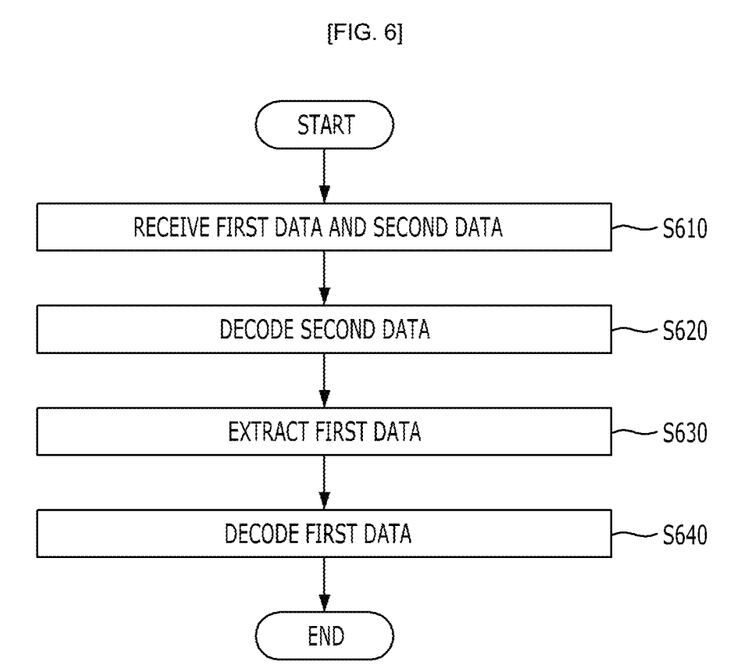
FIG. 6 is a flowchart of a data receiving method of a receiving device according to one or more embodiments of the present disclosure.

FIG. 6 is a flowchart of a data receiving method of a receiving device according to one or more embodiments of the present disclosure. The flowchart illustrated in FIG. 6 may be performed by a receiving device illustrated in FIG. 13.

According to one or more embodiments, in operation S610, the receiving device may receive a signal including a first data transmitted from the transmitting device and a second data transmitted from the electronic device including the intelligent reflecting surface. According to various embodiments, the first data may be primary data to be transmitted to the receiving device by the transmitting device and the second data may be secondary data transmitted to the receiving device by the electronic device.

According to one or more embodiments, the electronic device may reflect first data from the transmitting device and an unmodulated carrier to transmit the second data. According to various embodiments, the electronic device reflects the first data using the beamforming technique to transmit the first data to the receiving device and modulates the second data on the unmodulated carrier to transmit the second data to the receiving device.

According to one or more embodiments, in operation S620, the receiving device applies a bandpass filter to the received signal to decode the second data. According to various embodiments, the signal received by the receiving device may have a structure as illustrated in FIG. 4B and a center frequency of the bandpass filter may be $f_c$. That is, the receiving device may extract only the second data which is modulated on the unmodulated carrier by the bandpass filter to decode the second data. For example, the second data may be modulated in the M-ary phase shift keying (MPSK) manner.

According to one or more embodiments, in operation S630, the receiving device may extract the first data from the signal based on the decoded second data. For example, the receiving device reconstructs and subtracts out the second data from the signal with the structure as illustrated in FIG. 4B using the bandpass filter to extract only the first data from the received signal. According to various embodiments, in operation S640, the receiving device may decode the extracted first data.

Figure 7A:
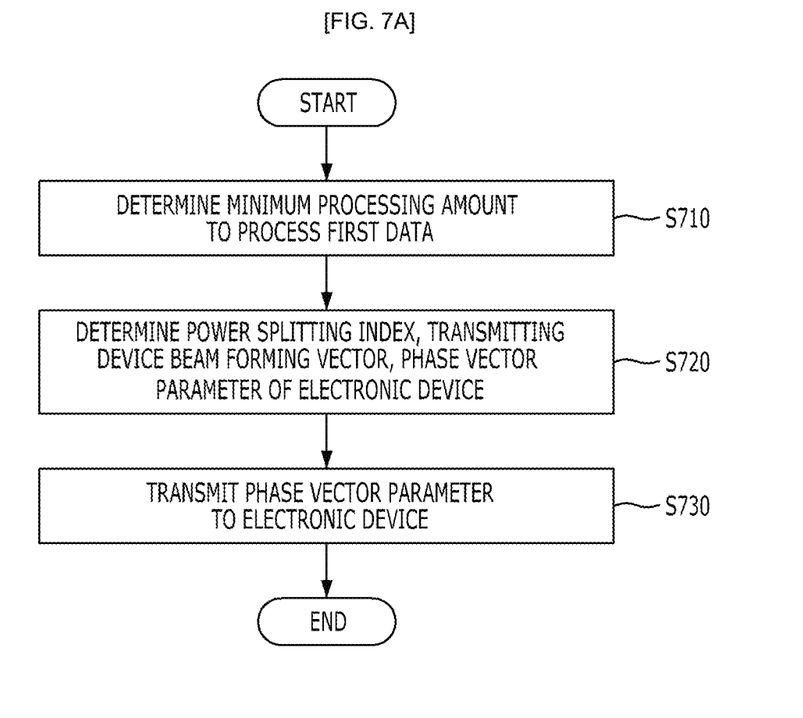
FIG. 7A is a flowchart of a determining method of a power-splitting factor of a transmitting device, a transmitting device beamforming vector, and a first phase vector parameter of an electronic device according to one or more embodiments of the present disclosure.

FIG. 7A is a flowchart of a determining method of a power-splitting factor, a transmitting device beamforming vector, and a first phase vector parameter of an electronic device according to one or more embodiments of the present disclosure. The flowchart illustrated in FIG. 7A may be performed by a transmitting device illustrated in FIG. 13.

Figure 7B:
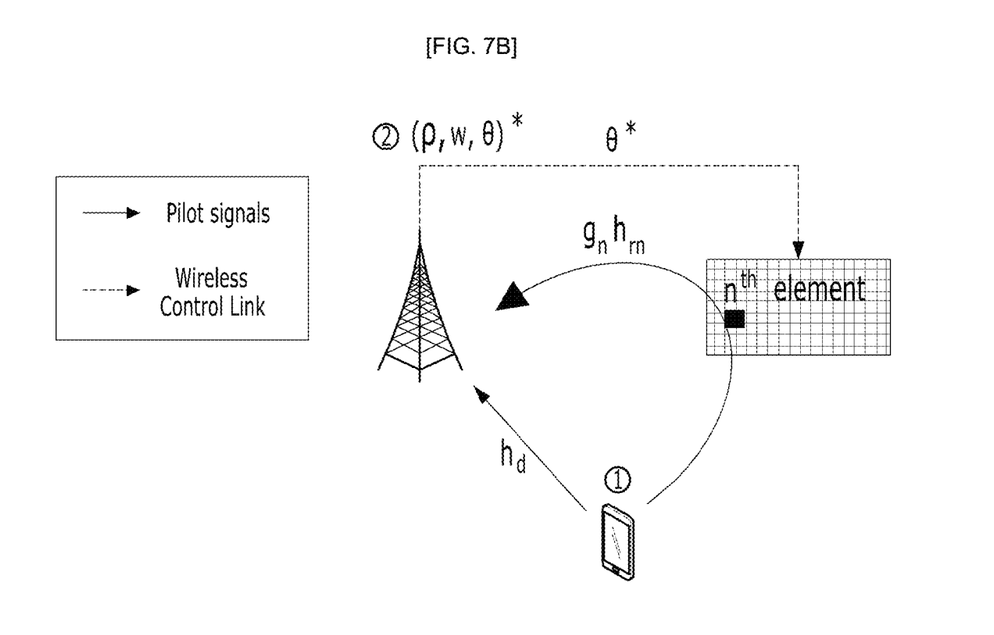
FIG. 7B is a view illustrating a process of estimating a channel in a transmitting device and transmitting a parameter to an electronic device according to one or more embodiments of the present disclosure.

FIG. 7B is a view illustrating channel estimation and parameter transmission for optimizing a parameter of the present disclosure before performing the flowchart illustrated in FIG. 7A. According to one or more embodiments, the wireless communication system of the present disclosure may assume channel reciprocity in a time division duplexing (TDD) manner which utilizes the same frequency band in up/down links. Accordingly, the transmitting device may estimate a channel by transmitting and receiving pilot signals. When the receiving device transmits a pilot signal, the transmitting device may acquire information about a composite channel of a direct link channel $h_d$ and a relay-reflection link $(G \cdot h_r)$. While the receiving device transmits the pilot signal, the transmitting device may acquire channel information for each reflecting element by turning on N reflecting elements of the intelligent reflecting surface embodied in the electronic device, one at a time and turning off rest of the reflecting elements. Specifically, a channel between the transmitting device, the n-th reflecting element of the electronic device, and the receiving device may be $g_n h_m$ and a dimension of the matrix may be $g_n h_m \in \mathbb{C}^{1 \times K}$.

According to one or more embodiments, in operation S710, a minimum throughput to process the first data may be determined. According to various embodiments, the minimum throughput to process the first data may be a minimum data throughput to satisfy a quality of service (QoS) for the first data in the corresponding communication system.

According to one or more embodiments, in operation S720, the transmitting device may determine a power-splitting factor ρ related to the transmission of the first data and the second data, a transmitting device beamforming vector w, a first phase vector θ* parameter of the electronic device related to the transmission of the first data and the second data which maximize the second data throughput $R_s$ based on the determined minimum throughput $R^r_p$ and the estimated channel. For example, when a data throughput related to the first data is $R_p$ and a data processing amount related to the second data is $R_s$, a parameter which maximizes the second data throughput while satisfying the minimum throughput to process the first data may be determined based on the following Equation 4. According to various embodiments, the power-splitting factor ρ of the transmitting device needs to be a real number between 0 and 1 and each element value $θ_n$ of the reflection phase vector of the electronic device needs to be a real number between 0 and 2π. Both $R_s$ and $R_p$ may be functions of the three parameters.

$$\begin{aligned}
&\max_{\rho, w, \theta} \quad R_s \\
&\text{s.t.} \quad R_p \geq R^r_p \\
&\quad 0 \leq \rho \leq 1 \\
&\quad 0 \leq \theta_n \leq 2\pi, \forall n
\end{aligned} \quad \text{Equation 4}$$

According to one or more embodiments, in operation S730, the transmitting device may transmit the determined electronic device reflection phase vector θ to the electronic device. The electronic device is assumed to be passive and thus a wireless control link between the transmitting device and the electronic device may be a one-way control link. The transmitting device may transmit the calculated parameters to the electronic device through the one-way wireless control link between the transmitting device and the electronic device. The transmitting device and the electronic device may transmit and reflect the signal using the power-splitting factor ρ used to transmit the first data and the second data, the transmitting device beamforming vector w, and the first phase vector θ* of the electronic device which are used to transmit the first data and the second data, based on the parameters.

Figure 8:
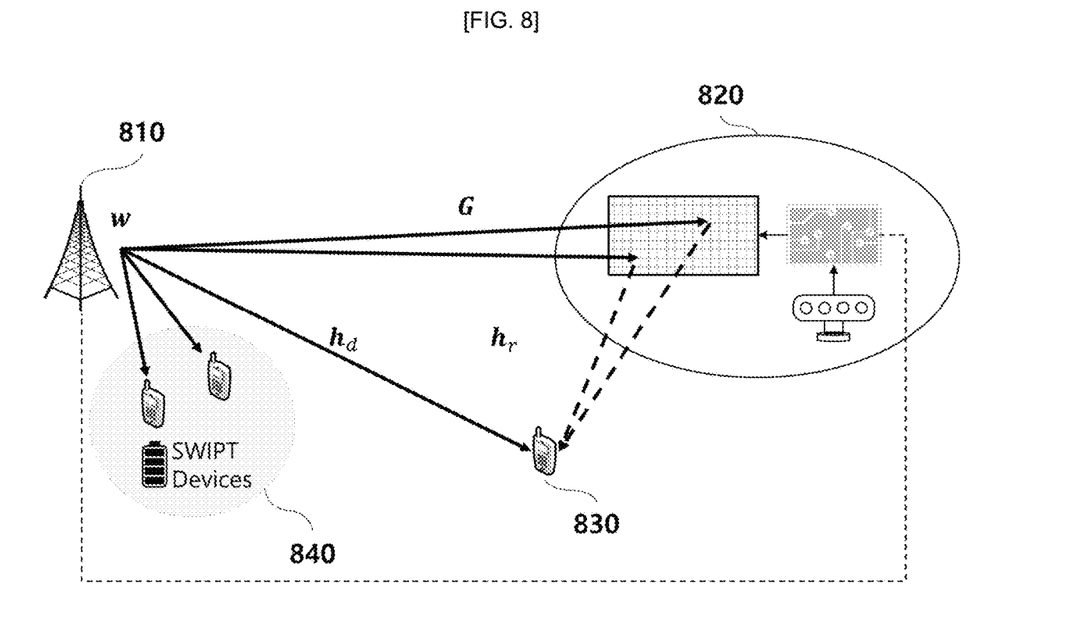
FIG. 8 is a view illustrating a wireless communication technique using an intelligent reflecting surface according to one or more embodiments of the present disclosure in an expanded way to support simultaneous wireless information and power transfer (SWIPT).

FIG. 8 is a view illustrating a wireless communication technique using an intelligent reflecting surface according to one or more embodiments of the present disclosure in an expanded way to support simultaneous wireless information and power transfer (SWIPT). In FIG. 8, a wireless communication system expands the technique of the present disclosure to support simultaneous wireless information and power transfer (SWIPT).

Figure 9A:
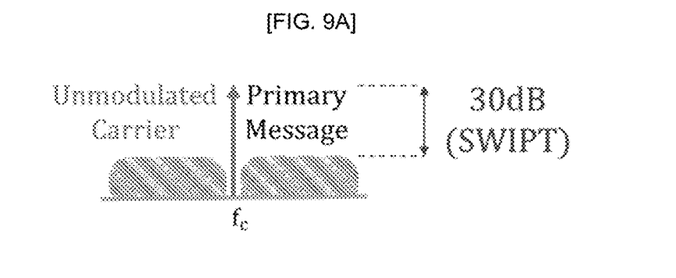
FIG. 9A is a view illustrating a difference in power of a transmission signal of a transmitting device that supports simultaneous wireless information and power transfer according to one or more embodiments of the present disclosure.

The wireless communication system may include a transmitting device 810, an electronic device 820, a receiving device 830, and an SWIPT receiving device 840. The transmitting device 810 splits the transmission power to transmit a sum of primary data and an unmodulated carrier to the electronic device 820. The transmission signal of the transmitting device 810 may simultaneously support the SWIPT receiving device 840 using a sum structure of the primary data and the unmodulated carrier. This will be further described below in more detail with reference to FIG. 9. The electronic device 820 may support primary and secondary communication systems by the same phase modulation manner as the electronic device 320. Unlike the receiving device 330, the receiving device 830 may not require a separate bandpass filter.

FIG. 9A is a view illustrating a difference in power of a transmission signal of a transmitting device that supports simultaneous wireless information and power transfer according to one or more embodiments of the present disclosure. In FIG. 9A, a transmission data structure of the transmitting device 810 is illustrated in an expanded wireless communication system. In existing SWIPT systems, the primary data and the unmodulated carrier power signal may be simultaneously transmitted to the SWIPT receiving device using a frequency-splitting method. Specifically, when a power difference between the unmodulated carrier power signal and the data signal is 30 dB or higher, due to their wildly distinct receiver sensitivities, a low power non-linear envelope detector at the SWIPT receiving device can be utilized to effectively and linearly separate the data and the power signal to be simultaneously processed. The power split transmitting signal proposed by the present disclosure may include a similar structure to the above structure and, thus, may simultaneously support the SWIPT receiving device 840. In an actual implementation, a DC-biased OFDM signal may be used for various applications. Specifically, the modulated primary data may be modulated on all subcarriers excluding the center carrier frequency $f_c$.

Figure 9B:
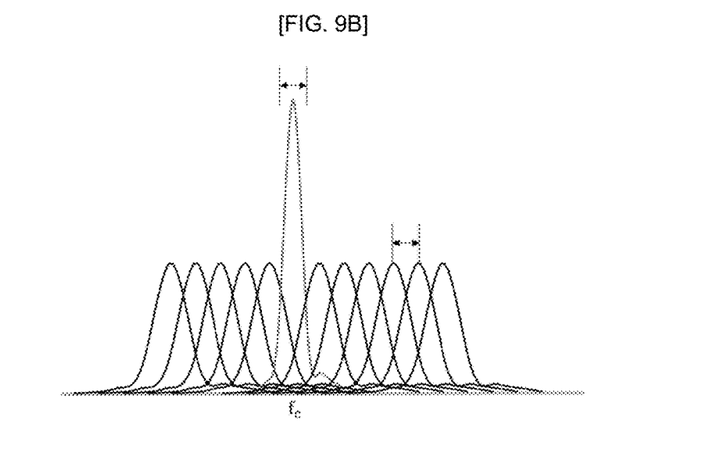
FIG. 9B is a view of a method of transmitting second data modulated in a DC-biased orthogonal frequency division multiplexing (DC-biased OFDM) signal of a transmitting device according to one or more embodiments of the present disclosure.

FIG. 9B is a view of a method of transmitting second data modulated in a DC-biased orthogonal frequency division multiplexing (DC-biased OFDM) signal of a transmitting device according to one or more embodiments of the present disclosure. In FIG. 9B, a DC-biased OFDM transmission signal of the transmitting device 810 being reflected by the electronic device 820 to transmit second data is illustrated. The second data may use the M-ary PSK modulation method. Further, the M-ary PSK modulation method which occupies the same bandwidth as the subcarrier spacing of the OFDM signal may be used. That is, the transmission rate of the second data may be maintained at the same data transmission rate as the respective subcarrier information.

Figure 10:
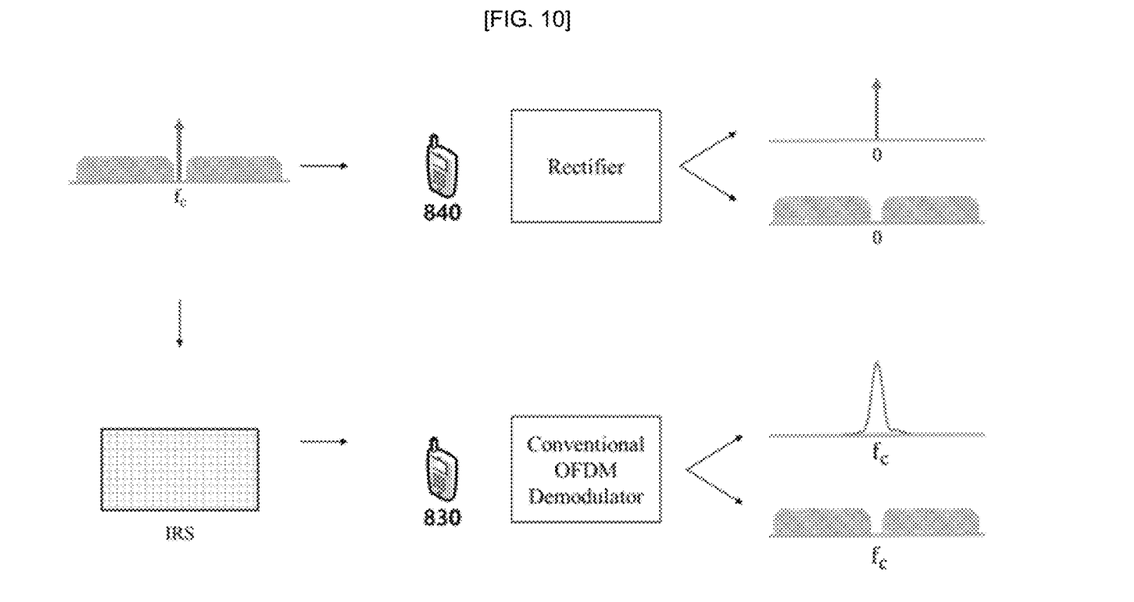
FIG. 10 is a view illustrating an operation of an SWIPT energy collecting device and a receiving device according to one or more embodiments of the present disclosure.

FIG. 10 is a view illustrating an operation of an SWIPT energy collecting device and a receiving device according to one or more embodiments of the present disclosure. In FIG.

10, a signal sent by the electronic device 820 by reflecting the DC-biased OFDM of the transmitting device 810 is illustrated to be processed by the receiving device 830. When the second data transmission rate is maintained to be the same as the subcarrier spacing of the OFDM, the existing OFDM receiver may be used to detect both the first data and the second data without causing interference between the two data. Thereafter, as represented in Equation 4, optimal parameters for maximizing a communication performance of the detected second data may be determined.

According to one or more embodiments, a frequency sharing technique using the electronic device including the intelligent reflecting surface is used to perform full-duplex communication which simultaneously transmits the first data and the second data. By doing this, the secondary communication system may be effectively supported by solving the limited distance issue of the existing ambient backscattering communication. Further, when the primary communication system is supported, a coverage of a millimeter wave with shadow area issue may be extended. Further, extending to the SWIPT system, a high-power signal is transmitted as with an unmodulated carrier wave signal by to support wireless energy harvesting for Internet of Things devices Passive beamforming is applied to all operations such that reception power is enhanced with low price and communication performance is improved.

According to one or more embodiments, when a direct link is blocked by, for example, a wall and the like between rooms, a detour route through the electronic device is provided to support communication between the transmitting device and the receiving device. Further, according to the characteristic of the metasurface which is easily installed, the intelligent reflecting surface may be coated on a wall or a ceiling in an indoor environment, an external wall of a building in an outdoor environment, a road signal, a billboard at a bus stop in an outdoor environment, or the like. Accordingly, the present disclosure is expected to be widely applied to 5G cellular and ultra-high density Internet of things environment in the future and specifically, it is applicable to a market such as smart homes/buildings/factories and vehicle-to-vehicle communication.

Figure 11:
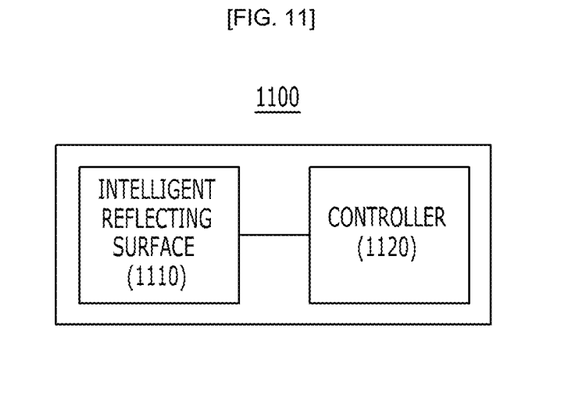
FIG. 11 is a block diagram of an electronic device according to one or more embodiments of the present disclosure.

FIG. 11 is a block diagram of an electronic device according to one or more embodiments of the present disclosure.

According to one or more embodiments, an electronic device 1100 includes an intelligent reflecting surface 1110 which reflects all or a part of a received signal and a controller 1120 which controls the intelligent reflecting surface 1110 to determine a first phase of the intelligent reflecting surface to increase a relay gain of first data, determine a second phase related to second data, and control a phase of the intelligent reflecting surface based on a sum of the first phase and the second phase to reflect the first data and the second data to the receiving device by the beamforming.

According to one or more embodiments, the intelligent reflecting surface 1110 may include a metasurface which converts a baseband signal related to the second data into a passband signal using an unmodulated carrier to transmit the second data. According to various embodiments, the controller 1120 of the electronic device 1100 controls a reflection phase by applying an applied voltage value corresponding to a sum of a first phase for increasing a relay gain of the first data and a second phase related to the second data to reflecting elements of the intelligent reflecting surface 1120 to reflect the first data and the unmodulated carrier from the transmitting device to transmit a signal including first data and second data to the receiving device.

Figure 12:
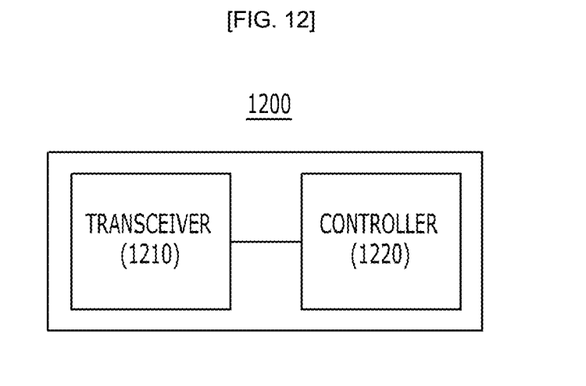
FIG. 12 is a block diagram of a receiving device according to one or more embodiments of the present disclosure.

FIG. 12 is a block diagram of a receiving device according to one or more embodiments of the present disclosure.

According to one or more embodiments, the receiving device 1200 includes a transceiver 1210 which transmits and receives a signal, and a controller 1220 which controls the transceiver 1210 to receive a signal including first data transmitted from the transmitting device and second data from the electronic device including the intelligent reflecting surface, applies a bandpass filter to the signal to decode the second data, extracts the first data from the signal based on the decoded second data, and decodes the extracted first data.

According to one or more embodiments, in the receiving device 1200, a transmitter and a receiver are separately configured. That is, the receiving device 1200 may receive a signal including the first data and the second data from the transmitting device and the electronic device through the receiver and transmit a pilot signal through the transmitter.

Figure 13:
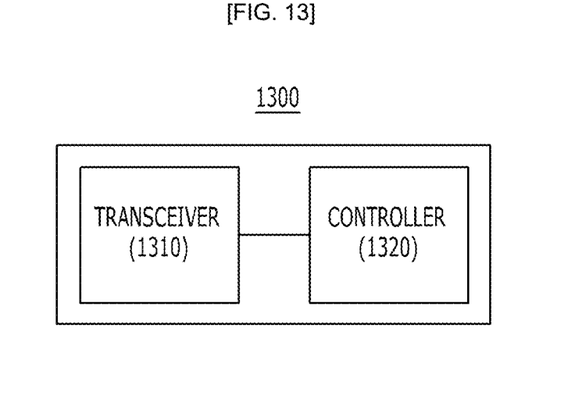
FIG. 13 is a block diagram of a transmitting device according to one or more embodiments of the present disclosure.

FIG. 13 is a block diagram of a transmitting device according to one or more embodiments of the present disclosure.

According to one or more embodiments, the transmitting device 1300 includes a transceiver 1310 which transmits a signal formed by a sum of a primary data signal and an unmodulated carrier and a controller 1320 which determines a power-splitting factor, a transmitting device beamforming vector, and a first phase vector parameter of an electronic device and transmits the determined first phase vector parameter of the electronic device to the electronic device through a wireless control link.

According to one or more embodiments, the controller 1320 may control the transceiver 1310 to estimate a channel through the received pilot signal, determine a minimum throughput required in the system to process the first data, determine a power-splitting factor, a transmitting device beamforming vector, and a first phase vector parameter of the electronic device which simultaneously satisfy the minimum throughput condition of the first data and maximize the throughput of the second data based on the estimated channel and the determined minimum throughput, and transmit the determined first phase vector parameter of the electronic device to the electronic device.

The metasurface, transmitting device, electronic device, receiving device, SWIPT receiving device, transmitting device, intelligent reflecting surface 1110, controller 1120, 1220, 1320, and transceiver 1210, 1310 in FIGS. 2-13 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
    an intelligent reflecting surface configured to reflect all or a part of a received signal; and
    an electronic device controller configured to control the intelligent reflecting surface to determine a first phase of the intelligent reflecting surface to increase a relay gain of first data of the received signal, determine a second phase related to second data, and control a phase of the intelligent reflecting surface based on a sum of the first phase and the second phase to reflect the first data and the second data to a receiving device by beamforming.

2. The electronic device of claim 1, wherein a difference between a transmission rate of the first data and a transmission rate of the second data is substantially equal to or higher than a predetermined threshold value.

3. The electronic device of claim 1, wherein the intelligent reflecting surface comprises a metasurface configured to convert a baseband signal related to the second data into a passband signal using an unmodulated carrier for transmitting the second data.

4. The electronic device of claim 1, wherein the first data and the second data are reflected to the receiving device, the receiving device comprising:
   a receiver transceiver; and
   a receiver controller configured to control the receiver transceiver to receive a signal comprising the first data and the second data, apply a bandpass filter to the signal to decode the second data, extract the first data from the signal based on the decoded second data, and decode the extracted first data.

5. The electronic device of claim 4, wherein the second data is modulated in an M-ary phase shift keying (MPSK) manner and the receiver controller is further configured to extract the first data from the received signal based on a phase corresponding to information of the decoded second data to estimate data from a transmitting device.

6. The electronic device of claim 4, wherein the received signal is transmitted from a transmitting device, the transmitting device comprising:
   a transmitter transceiver configured to transmit a signal comprising a sum of primary data and an unmodulated carrier, and receive a pilot signal; and
   a transmitter controller configured to
      determine a minimum throughput required for a wireless communication system to process the first data,
      determine a power-splitting factor related to the transmission of the first data and the second data, a transmitting device beamforming vector, and a first phase vector parameter of the electronic device based on the determined minimum throughput, and
      transmit the determined first phase vector parameter of the electronic device to the electronic device.

7. The electronic device of claim 6, wherein the wireless communication system comprises the electronic device, the transmitting device, and the receiving device.

8. The electronic device of claim 1, wherein a wireless communication technique configured to support the first data, the second data, and simultaneous wireless information and power transfer (SWIPT).

9. The electronic device of claim 8, wherein when a DC-biased OFDM signal is utilized in transmission of the received signal, a transmission rate of subcarrier data of the first data and a transmission rate of the second data are substantially equal.

10. The electronic device of claim 8, wherein when a transmission rate of subcarrier data of the first data and a transmission rate of the second data are substantially equal, an existing OFDM receiver is available in the receiving device.

11. A data processing method including an intelligent reflecting surface, the method comprising:
   determining a first phase of the intelligent reflecting surface to increase a relay gain of first data;
   determining a second phase related to second data; and
   reflecting the first data and the second data to a receiving device through beamforming by controlling a phase of the intelligent reflecting surface based on a sum of the first phase and the second phase.

12. The data processing method of claim 11, further comprising:
   setting a difference between a transmission rate of the first data and a transmission rate of the second data to be substantially equal to or higher than a predetermined threshold value.

13. The data processing method of claim 11, further comprising:
   after the reflecting the first data and the second data to the receiving device,
   receiving a reflected signal of the reflecting of the first data and the second data, wherein the first data is transmitted from a transmitting device and the second data is transmitted from an electronic device;
   decoding the second data by applying a bandpass filter to the reflected signal;
   extracting the first data from the reflected signal based on the decoded second data; and
   decoding the extracted first data.

14. The data processing method of claim 13, wherein the second data is modulated in an M-ary phase shift keying (MPSK) manner and,
   in the extracting of the first data, the first data is extracted from the reflected signal based on a phase corresponding to information of the decoded second data.

15. The data processing method of claim 11, further comprising:
   before the determining of the first phase,
   estimating a channel;
   determining a minimum throughput to process the first data;
   determining a power-splitting factor, a beamforming vector, a first phase vector parameter of the electronic device related to transmission of the first data and the second data based on the determined minimum throughput; and
   transmitting the determined first phase parameter to the electronic device.

* * * * *